(12) United States Patent  
Gonia et al.

(10) Patent No.: US 9,535,153 B2  
(45) Date of Patent: Jan. 3, 2017

(54) SYSTEM AND METHOD FOR IMPROVED LOCATION ACCURACY

(71) Applicant: Honeywell International Inc., Morristown, NJ (US)

(72) Inventors: Patrick S. Gonia, Maplewood, MN (US); Soumitri Kolavennu, Blaine, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/481,045

(22) Filed: Sep. 9, 2014

(65) Prior Publication Data

US 2016/0069983 A1    Mar. 10, 2016

(51) Int. Cl.
| | |
|---|---|
| H04W 24/00 | (2009.01) |
| G01S 5/02 | (2010.01) |
| G01S 1/08 | (2006.01) |
| G01S 1/10 | (2006.01) |
| G01S 1/14 | (2006.01) |
| G01S 1/70 | (2006.01) |
| G01S 3/783 | (2006.01) |
| G01S 5/12 | (2006.01) |
| G01S 5/16 | (2006.01) |

(52) U.S. Cl.
CPC ............... *G01S 5/0205* (2013.01); *G01S 1/08* (2013.01); *G01S 1/10* (2013.01); *G01S 1/14* (2013.01); *G01S 1/70* (2013.01); *G01S 3/783* (2013.01); *G01S 5/12* (2013.01); *G01S 5/16* (2013.01)

(58) Field of Classification Search
CPC .................................................... H04W 64/00
USPC ......................................................... 455/456.1
See application file for complete search history.

(56) References Cited

U.S. PATENT DOCUMENTS

| | | | |
|---|---|---|---|
| 7,188,000 | B2 | 3/2007 | Chiappetta et al. |
| 7,345,582 | B2* | 3/2008 | Gould ...................... 340/539.26 |
| 7,603,129 | B2 | 10/2009 | Gonia et al. |
| 7,609,159 | B2* | 10/2009 | Benson et al. ............... 340/540 |
| 8,442,801 | B2* | 5/2013 | Gonla et al. .................. 702/150 |
| 2007/0030832 | A1* | 2/2007 | Gonia et al. .................. 370/338 |
| 2008/0168826 | A1* | 7/2008 | Saidi et al. ....................... 73/40 |
| 2009/0212995 | A1* | 8/2009 | Wu et al. ...................... 342/109 |

(Continued)

OTHER PUBLICATIONS

Partial Search Report, PCT/US2015/048012, dated Dec. 14, 2015, 8 pages.

*Primary Examiner* — Santiago Garcia
(74) *Attorney, Agent, or Firm* — Conley Rose, P.C.; Kristin Jordan Harkins

(57) ABSTRACT

Systems and methods for improved location accuracy are provided. For example, some systems can include a location engine, and a plurality of location anchors. In some embodiments, each of the plurality of location anchors can transmit or receive signals to or from an object for determining an angular orientation of the object with respect to the plurality of location anchors, and based on the angular orientation, the location engine can estimate a location of the object. In some embodiments, each of the plurality of location anchors can transmit first signals to the location engine, the location engine can receive a second signal from an object, based on the first signals and the second signal, the location engine can determine a differential pressure between the plurality of location anchors and the object, and based on the differential pressure, the location engine can estimate an altitude of the object.

20 Claims, 4 Drawing Sheets

(56) References Cited

U.S. PATENT DOCUMENTS

| | | |
|---|---|---|
| 2009/0253388 A1* | 10/2009 | Kielb et al. .................... 455/117 |
| 2010/0085579 A1 | 4/2010 | Carlen |
| 2010/0305752 A1 | 12/2010 | Abramson |
| 2011/0151810 A1 | 6/2011 | Su et al. |
| 2011/0161885 A1* | 6/2011 | Gonia et al. .................. 715/847 |
| 2011/0256800 A1 | 10/2011 | Jennings et al. |
| 2011/0298615 A1* | 12/2011 | Rich et al. ............... 340/539.13 |
| 2012/0129535 A1* | 5/2012 | Oh et al. ........................ 455/438 |
| 2013/0155102 A1 | 6/2013 | Gonia et al. |
| 2014/0051459 A1 | 2/2014 | Gonia |
| 2014/0073363 A1* | 3/2014 | Tidd et al. ................. 455/456.5 |
| 2014/0074743 A1* | 3/2014 | Rademaker ................... 705/334 |
| 2014/0194142 A1* | 7/2014 | Hedley et al. ............. 455/456.1 |
| 2014/0200023 A1* | 7/2014 | Price et al. ................ 455/456.1 |
| 2014/0213283 A1* | 7/2014 | Gillett ........................ 455/456.1 |
| 2014/0248899 A1* | 9/2014 | Emadzadeh et al. ...... 455/456.1 |
| 2014/0295877 A1* | 10/2014 | Hart ........................... 455/456.1 |

\* cited by examiner

SYSTEM AND METHOD FOR IMPROVED LOCATION ACCURACY

FIELD

The present invention relates generally to location anchors. More particularly, the present invention relates to a system and method for improved location accuracy.

BACKGROUND

Location systems are known for providing location estimations for tracking the location of an object, for example, a mobile device, within a region, for example, a building, plant, or other facility. For example, many known location systems include location anchors (LA).

In many known location systems, an object can transmit a probe request to a location anchor and receive a probe response from the location anchor. The object can then measure the received signal strength indication (RSSI) of the probe response to estimate the distance to the location anchor.

The following documents disclose exemplary location systems that include exemplary location anchors: U.S. Pat. No. 7,603,129 titled "Localization Identification System for Wireless Devices"; U.S. Pat. No. 8,442,801 titled "Wireless Location-Based System for Detecting Hazardous Conditions"; U.S. Publication No. 2013/0155102 titled "Systems and Method of Accuracy Mapping in a Location Tracking System"; U.S. Publication No. 2011/0161885 titled "Wireless Location-Based System and Method for Detecting Hazardous and Non-Hazardous Conditions"; and U.S. Publication No. 2014/0051459 titled "System and Method for Improved Location System Accuracy". Each of the above-identified documents is assigned to the assignee hereof and is hereby incorporated by reference.

Notwithstanding the above, known location systems can provide location estimations with only limited accuracy. To increase location accuracy, known location systems have added infrastructure in the form of more location anchors. However, such systems have limits, both in terms of accuracy and infrastructure.

In view of the above, there is a continuing, ongoing need for a system and method for improved location accuracy, especially in regions where additional accuracy is desirable.

DETAILED DESCRIPTION

Figure 1:
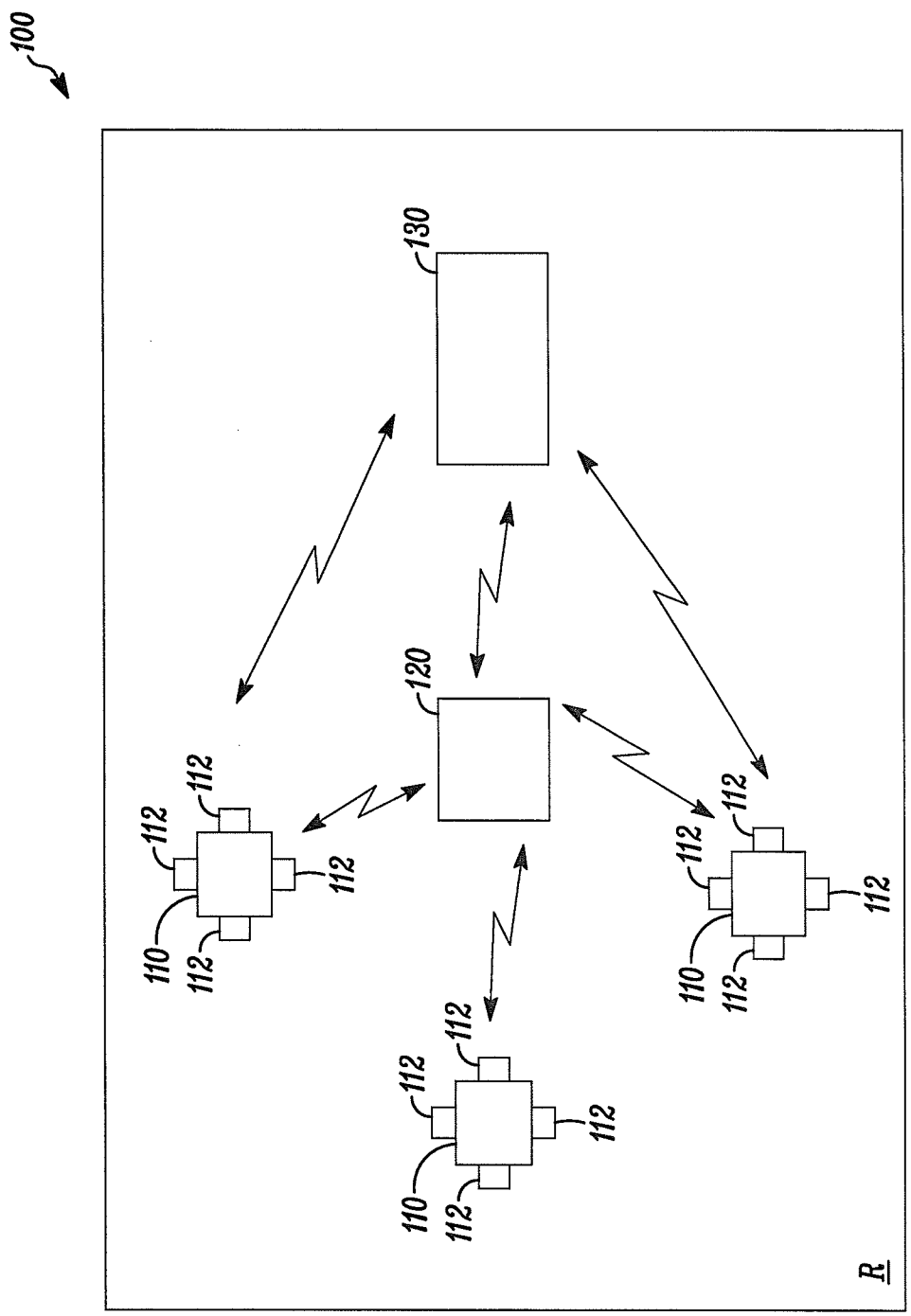
FIG. 1 is a block diagram of a system in accordance with disclosed embodiments in which location anchors include an array of directional electromagnetic radiation sources and/or transmitters.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods for improved location accuracy. For example, some systems and methods disclosed herein can include enhanced location anchors that can be IEEE 802.11-2007 compliant, that can provide additional information as compared to known location anchors, that can be used to increase location estimation accuracy as compared to known systems and methods, and that can be used to provide 3D location estimation. It is to be understood that a location anchor as disclosed herein can include any device that responds to a probe request signal with a probe response signal and/or that periodically transmits a beacon signal from a known location with a known transmission power and with an identifier that identifies the particular device/location anchor.

In accordance with disclosed embodiments, an object, for example, a mobile device, within a region, for example, a building, plant, or other facility, can transmit a probe request to a location anchor and receive a probe response from the location anchor that can include the additional information as disclosed herein. Then, the object and/or a location engine (LE) can use the additional information to improve and increase the accuracy of the location estimation of the object.

In some embodiments, the location engine and/or the object communicating with the location anchor can measure a round trip time-of-flight for the probe request and the probe response and use such a measurement to estimate distance information and/or the location of the object. In these embodiments, the location anchor can support a fixed known response latency.

In some embodiments, the location engine and/or the object communicating with the location anchor can estimate the angular position and/or orientation of the object with respect to the orientation of the location anchor. In these embodiments, the location anchor can include a plurality of directional electromagnetic radiation sources and/or transmitters, for example, antennas, signaling light emitting diodes (LEDs), or laser diodes, directed in a plurality of directions, and each transmission emitted by a directional transmitter can include a unique signal. Additionally or alternatively, in these embodiments, the location anchor can incorporate one or more receivers of electromagnetic radiation, for example, a plurality of directional receivers, such as light detectors, or a plurality of directional antennas and/or a plurality of omni-directional antennas that can be used in phased array beam forming.

In embodiments in which the location anchor includes directional transmitters, for example, LEDs, the object can include a photo detector that can receive the optical signals from the LEDs and, in some embodiments, based on the received signals, the object can determine an address or identifier of the location anchor and/or the angle of the location anchor relative to the position of the object. For example, in some embodiments, the object can determine the strongest signal received from location anchor. Then, the location engine and/or the object can estimate the angular orientation of the object with respect to the location anchor. In some embodiments, at least some of the location anchor's LEDs can be visible and/or infrared.

In embodiments in which the location anchor includes directional transmitters and/or directional receivers, beam forming or directional antennas can detect the angular position of the object with respect to the orientation of the location anchor by detecting the best beam pattern for transmitting a signal to the object and/or for receiving the probe request from the object. For example, in some embodiments, the location anchor can determine the beam pattern at which strongest signal is received from the object. The angle corresponding to the best beam pattern and/or angular position can be transmitted to the location engine and/or the object, which can use such information to estimate the location of the object.

In some embodiments, the location anchor and/or the object communicating with the location anchor can incorporate a pressure sensor, for example, a barometric or atmospheric pressure sensor, to determine the vertical position and/or altitude of the object. For example, the location anchor can be placed at a fixed location in the monitored region at a fixed and known altitude. The location engine can receive a signal from the pressure sensor in one or more location anchors and from the pressure sensor in the object and determine a differential pressure between the one or more location anchors and the object. Then, based on the differential pressure, the location engine and/or the object can estimate the actual altitude, in the z direction, of the object with respect to the known altitude of the location anchor.

In some embodiments, the location engine can determine the location anchor(s) nearest, in the x and y directions, that is, in the horizontal plane, to the object and use the signals from the pressure sensors in the nearest location anchors for determining the differential pressure. Furthermore, in some embodiments, the location engine can weight the signals from the pressure sensors in the location anchors so that signals from the location anchors nearest, in the x and y directions, to the object have more weight in determining the differential pressure.

In some embodiments, the location engine can store time dependent pressure readings from the pressure sensors in the location anchors and use the stored readings to determine the differential pressure at any given time.

Figure 2:
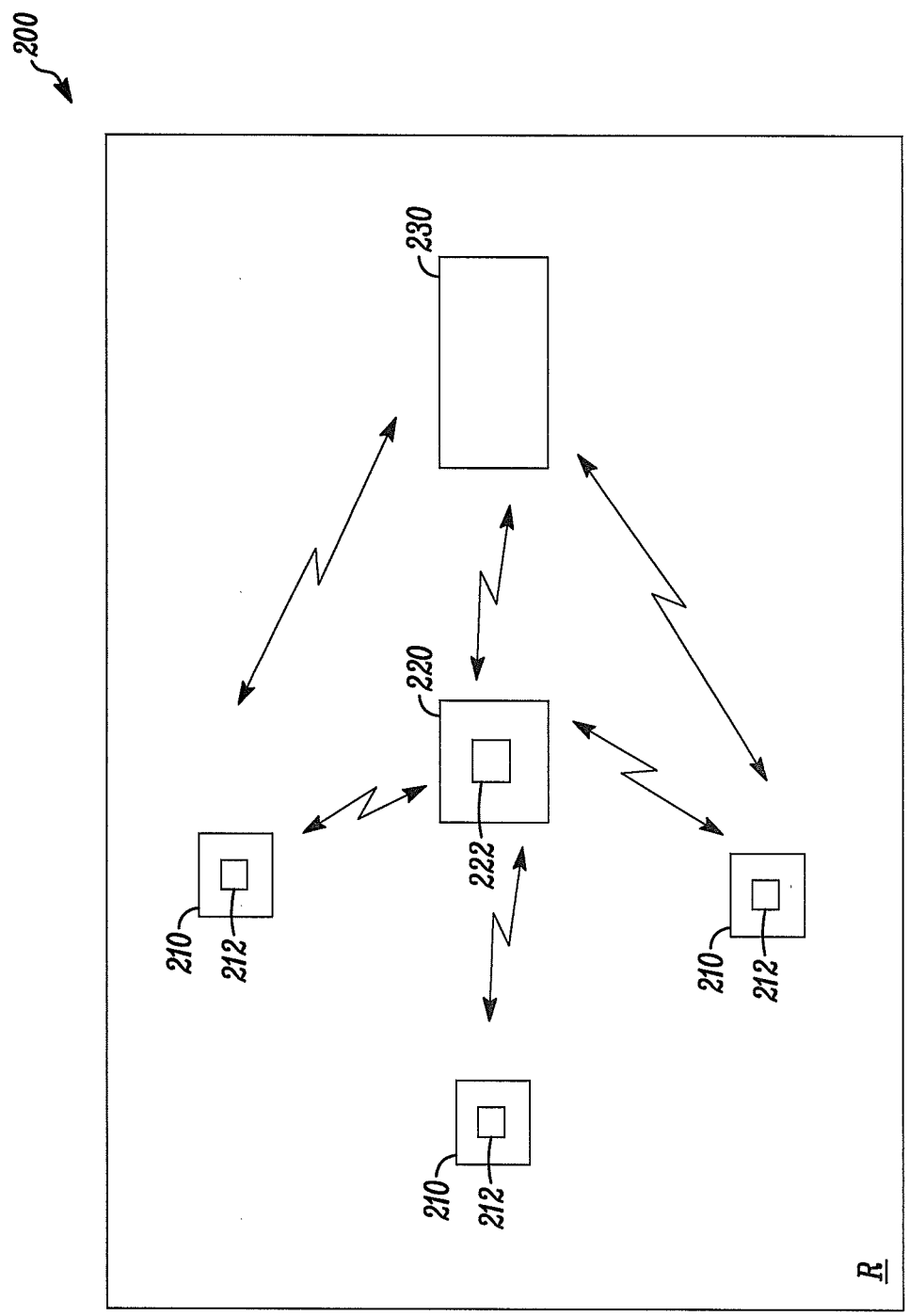
FIG. 2 is a block diagram of a system in accordance with disclosed embodiments in which location anchors include a pressure sensor.
Figure 3:
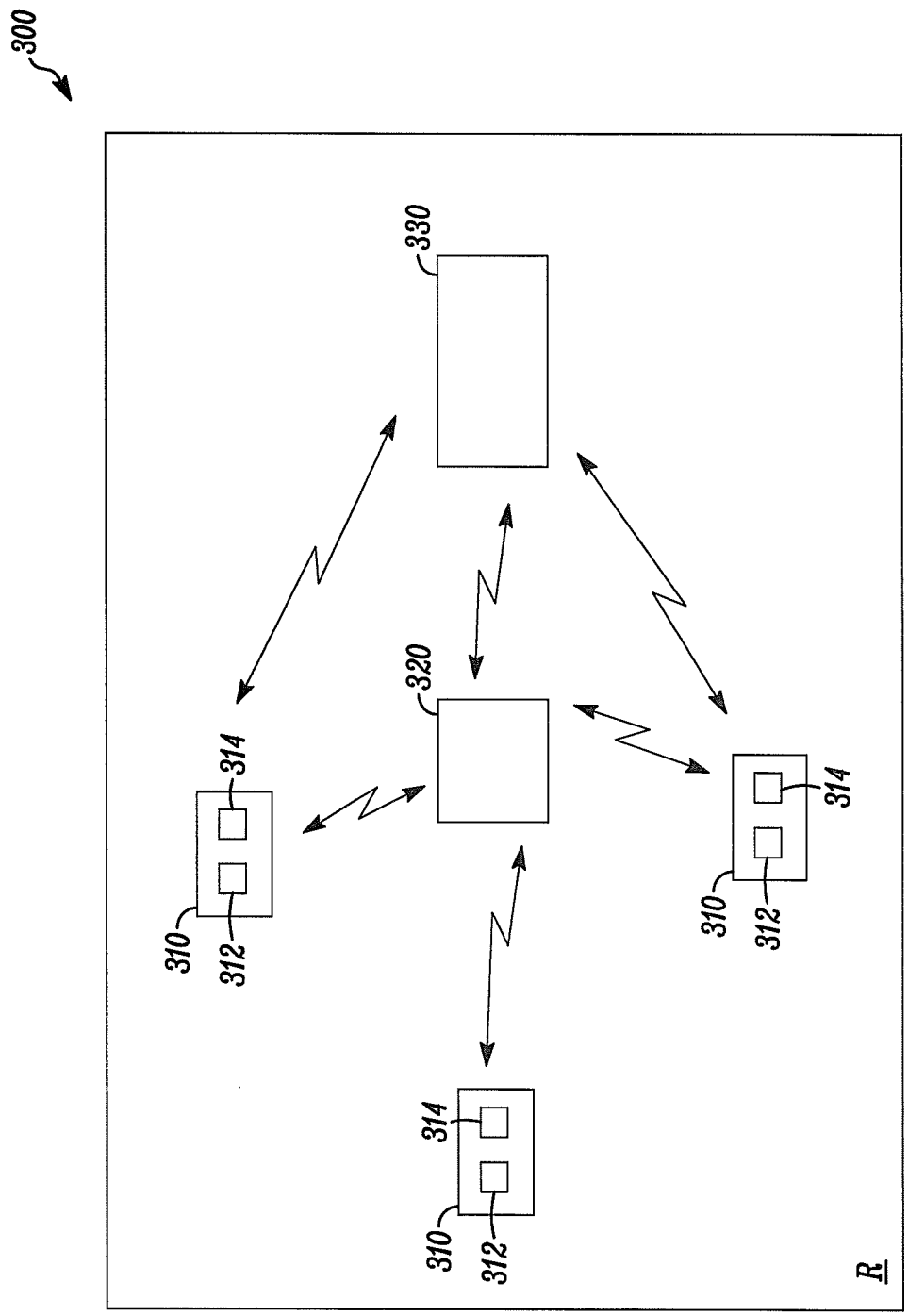
FIG. 3 is a block diagram of a system in accordance with disclosed embodiments in which location anchors include a phased array or directional antennas.

FIGS. 1-3 are block diagrams of systems 100, 200, 300 in accordance with disclosed embodiments that include location anchors 110, 210, 310. For example, the location anchors 110 in the system 100 in FIG. 1 can include an array of directional electromagnetic radiation sources and/or transmitters 112, the location anchors 210 in the system 200 in FIG. 2 can include a pressure sensor 212, and the location anchors 310 in the system 300 in FIG. 2 can include a phased array 312 or directional antennas 314. It is to be understood that embodiments disclosed herein can include each of the systems 100, 200, 300 individually and/or in combination.

As seen in FIG. 1, the system 100 can include a plurality of location anchors 110 with fixed and known locations in a monitored region R. The system 100 can also include an object 120 in the monitored region R that can communicate with at least some of the location anchors 110 and with a location engine 130. Although the location engine 130 is shown within the region R in FIG. 1, it is to be understood that in some embodiments, the location engine 130 can be located outside of the region R and in some embodiments, the location engine 130 can be located within the object 120.

Each location anchor 110 can include an array of directional electromagnetic radiation sources and/or transmitters, for example, LEDs 112, surrounding the perimeter of the location anchor 110 so that the location anchor 110 can transmit signals at a plurality of identifiable angles. That is, each of the LEDs 112 can transmit a signal, for example, a beam of light, in a respective direction. In some exemplary embodiments, the location anchor 110 can include eight LEDs, and each LED can have an approximate 45 degree beamwidth. In other exemplary embodiments, the beams from each LED can have a solid angle width in three dimensions. However, embodiments disclosed herein are not so limited.

In some embodiments, the LEDs 112 can emit a signal responsive to the respective location anchor 110 receiving a probe request from the object 120. However, in some embodiments, the LEDs 112 can emit a signal periodically or continuously irrespective of receiving a probe request from the object 120.

In some embodiments, the signal emitted by each LED 112 can include an identifier, for example, the common MAC address of the respective location anchor 110. Additionally or alternatively, in some embodiments, the signal emitted by each LED 112 can include a sub-identifier or sub-address to indicate the angular position or direction of the LED 112 on the location anchor 110.

The object 120 can receive at least some of the signals emitted by the LEDs 112 of the location anchors 110 in the region R. For example, in some embodiments, the object 120 can include an optical photo detector that can read data included in the signals from the LEDs 112. In some embodiments, the object 120 can transmit a compute location message (CLM) to the location engine 130 and can include the data read from the signals from the LEDs 112 in the CLM. The location engine 130 can then use the data in the CLM to estimate the angular orientation of the object 120 with respect to the orientation of the location anchor 110. For example, the object 120 and/or the location engine 130 can determine the strongest signal received from the LEDs 112 of the location anchors 110. In some embodiments, the location engine 130 can then use the determined angular orientation as well as information from RSSI signals to determine the location of the object 120 in two-dimensional or three-dimensional space.

In some embodiments, the LEDs 112 of each location anchor 110 can be time sequenced and transmit a respective signal in a respective time interval to avoid simultaneous transmission. Furthermore, in some embodiments, the LEDs 112 of nearby location anchors 110 can be time sequenced and transmit a respective signal in a respective time interval to avoid simultaneous transmission.

As seen in FIG. 2, the system 200 can include a plurality of location anchors 210 with fixed and known locations and with fixed and known altitudes in a monitored region R. The system 200 can also include an object 220 in the monitored region R that can communicate with at least some of the location anchors 210 and with a location engine 230. Although the location engine 230 is shown within the region R in FIG. 2, it is to be understood that in some embodiments, the location engine 230 can be located outside of the region R and in some embodiments, the location engine 230 can be located within the object 220.

Each location anchor 210 can include a pressure sensor 212, and each pressure sensor 212 can be continuously or periodically monitored as needed. For example, in some embodiments, a location anchor 210 can transmit the pressure measured by the pressure sensor 212 responsive to the respective location anchor 210 receiving a probe request from the object 220. However, in some embodiments, the location anchor 210 can transmit the pressure measured by the pressure sensor 212 periodically or continuously irrespective of receiving a probe request from the object 220.

The signal transmitted by the location anchor 210 can include data regarding a pressure reading of the sensor 212. In some embodiments, the object 220 can receive at least some of the signals transmitted by the location anchors 210 in the region R and can include the data from the pressure sensors 212 in a CLM transmitted to the location engine 130. However, in some embodiments, the location engine 130 can directly receive at least some of the pressure measurement signals transmitted by the location anchors 210 in the region R.

The object 220 can also include a pressure sensor 222, and the object 220 can include data regarding a pressure reading of the sensor 222 in the CLM transmitted to the location engine 230. The location engine 230 can then use the data in the CLM and/or the pressure measurement data received directly from the location anchors 210 to determine a differential pressure between the sensors 212, 222 and, based on the differential pressure, to estimate the altitude of the object 220. In some embodiments, the location engine 230 can then use the determined differential pressure and/or the estimated altitude as well as information from RSSI signals to determine the location of the object 220 in three-dimensional space.

As seen in FIG. 3, the system 300 can include a plurality of location anchors 310 with fixed and known locations in a monitored region R. The system 300 can also include an object 320 in the monitored region R that can communicate with at least some of the location anchors 310 and with a location engine 330. Although the location engine 330 is shown within the region R in FIG. 3, it is to be understood that in some embodiments, the location engine 330 can be located outside of the region R and in some embodiments, the location engine 330 can be located within the object 320.

Each location anchor 310 can include one or more transmitters and/or receivers of electromagnetic radiation. For example, in some embodiments, each location anchor 310 can include a phased array 312 that includes multiple antennas. Additionally or alternatively, in some embodiments, each location anchor 310 can include a directional antenna 314. The phased array 312 and/or the directional antenna 314 can transmit and/or receive signals sequentially at a plurality of identifiable angles.

For example, in some embodiments, at least some of the phased arrays 312 and/or the directional antennas 314 in the region R can receive a probe request from the object 320 and responsive thereto, the respective location anchor 310 can determine the phase pattern that best receives the probe request and/or that receives the strongest signal from the object 320 and thereby estimate the angular position or direction of the object 320 relative to the location anchor 310. Then, the location anchor 310 can transmit a message to the object 320 and/or to the location engine 330 with the estimated angular position or direction. In some embodiments, the location engine 330 can then use the determined angular orientation as well as information from RSSI signals to determine the location of the object 320 in two-dimensional or three-dimensional space.

Figure 4:
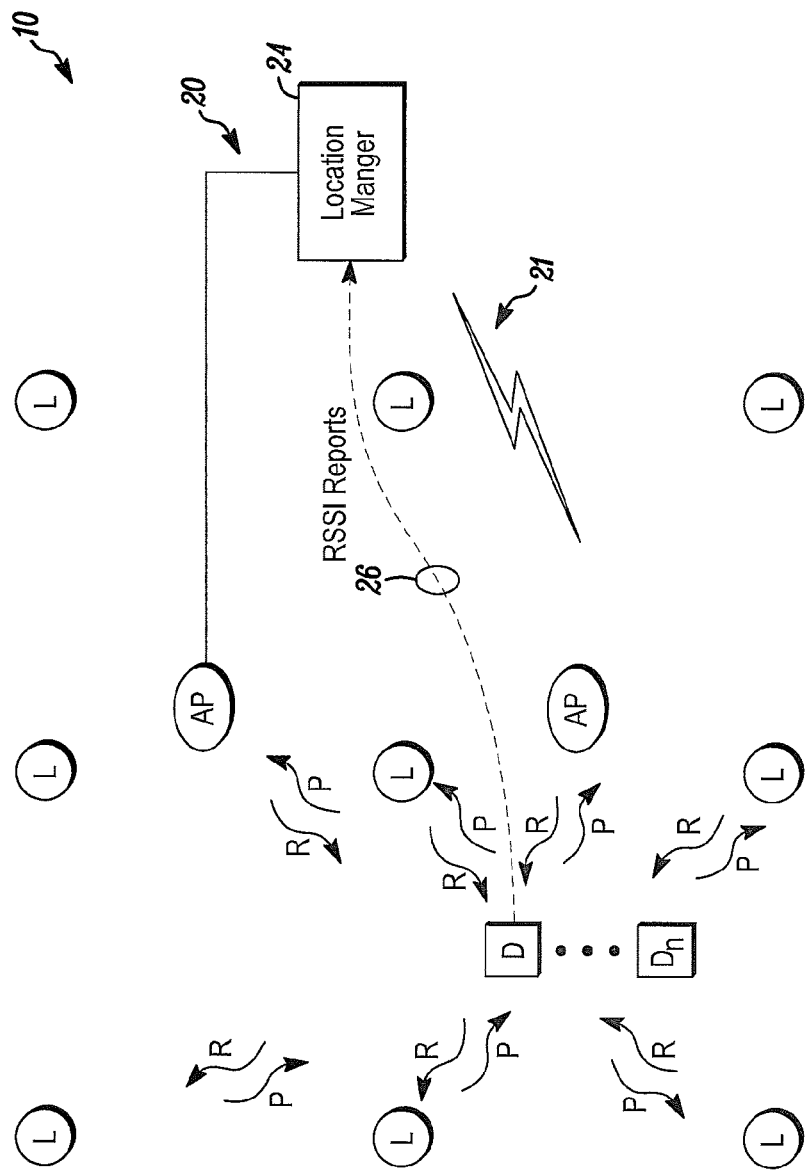
FIG. 4 is a schematic diagram of a system in accordance with disclosed embodiments.

FIG. 4 further illustrates some of the embodiments disclosed herein. As seen in FIG. 4, a wireless regional monitoring system 10 can be installed in a region R1. Access points AP can provide wireless local area network service through the region R1 via backhaul wires 20 and/or via a wireless backhaul link 21 to a location engine, for example, location manager 24. Furthermore, members of a plurality of relatively low cost location anchors L can be distributed throughout the region R1.

In some embodiments, the location anchors L can provide responses R to wireless probes P received from objects such as mobile devices or units, for example, gas detectors D . . . Dn moving throughout the region R1 by transmitting the additional information as disclosed herein. For example, the location anchors L can transmit information related to the angular orientation of the objects D . . . Dn with respect to the location anchors L and/or information related to readings from pressure sensors in the location anchors L. In some embodiments, the location anchors L can transmit such information to the objects D . . . Dn, to the access points AP, and/or directly to the location manager 24, and in some embodiments, the location anchors L, the objects D . . . Dn, and/or the location manager 24 can use such information to determine an angular orientation of the objects D . . . Dn with respect to the location anchors L and accordingly, to estimate a location of the objects D . . . Dn and/or to determine a differential pressure between the objects D . . . Dn and the location anchors L and accordingly, to estimate an altitude of the objects D . . . Dn. That is, in some embodiments, at least the location manager 24 can use the determined angular orientation, the determined differential pressure and/or the estimated altitude as well as information from RSSI signals to determine the location of the objects D . . . Dn in two-dimensional or three-dimensional space.

As those of skill in the art will understand, each of the location anchors 110, 210, 310, and L, the objects 120, 220, 320, and D . . . Dn, and the location engines 130, 230, 330, and 24 can include a transceiver for supporting wireless communication therebetween and control circuitry, one or more programmable processors, and executable control software as would be understood by those of skill in the art. For example, in some embodiments, the transceiver can be and/or include one or both of the directional transmitters and directional receivers of the location anchors 110, 210, 310, and L.

The executable control software can be stored on a transitory or non-transitory computer readable medium, including, but not limited to, local computer memory, RAM, optical storage media, magnetic storage media, flash memory, and the like. In some embodiments, the control circuitry, the programmable processors, and/or the executable control software can execute and control the transmission of messages, data, and information between the location anchors 110, 210, 310, and L, the objects 120, 220, 320, and D . . . Dn, and the location engines 130, 230, 330, and 24 and the estimation of angular orientation, angular position or direction, and/or altitude of the objects 120, 220, 320, and D . . . Dn as disclosed herein.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:
1. A location anchor comprising:
a transceiver;
a programmable processor;
executable control software stored on a non-transitory computer readable medium;

a plurality of directional transmitters or a plurality of directional receivers of electromagnetic radiation; and a pressure sensor, wherein the plurality of directional transmitters or the plurality of directional receivers are positioned about a perimeter of the location anchor, wherein the directional transmitters are configured to transmit first signals to an object at a plurality of identifiable angles or the plurality of directional receivers are configured to receive second signals from the object at a plurality of identifiable angles, wherein, based on the first signals or based on the second signals, a location engine is configured to determine an angular orientation of the object with respect to the location anchor, wherein the transceiver is configured to transmit a signal that includes information related to a reading from the pressure sensor to a location engine, and wherein, based on the signal that includes the information related to the reading from the pressure sensor, the location engine is configured to:

determine a differential pressure between the pressure sensor and a second pressure sensor in the object, and, based on the differential pressure, the location engine is further configured to estimate an altitude of the object.

2. The location anchor of claim 1, wherein the transceiver includes one or more of the plurality of directional transmitters or the plurality of directional receivers.

3. The location anchor of claim 1, wherein the transceiver is configured to transmit, to the location engine, information related to the angular orientation of the object with respect to the location anchor, and wherein, based on the information, the location engine is configured to determine the angular orientation of the object with respect to the location anchor.

4. The location anchor of claim 3, wherein the location engine is configured to use the determined angular orientation of the object with respect to the location anchor to determine a location of the object.

5. The location anchor of claim 1, wherein the location anchor comprises the plurality of directional transmitters, and wherein each directional transmitter of the plurality of directional transmitters is configured to include information unique to a respective identifiable angle in a corresponding first signal of the first signals transmitted from the plurality of directional transmitters to the object.

6. The location anchor of claim 5, wherein the information includes an identifier of the location anchor and a sub-identifier indicative of an angular direction of the respective identifiable angle.

7. The location anchor of claim 1, wherein the location anchor comprises the plurality of directional transmitters, and wherein the plurality of directional transmitters is configured to transmit the first signals responsive to the transceiver receiving a probe request.

8. The location anchor of claim 1, wherein the plurality of directional transmitters is configured to transmit the first signals continuously or at periodic intervals.

9. The location anchor of claim 8, wherein the plurality of directional transmitters is configured to transmit the first signals at each of the plurality of identifiable angles in a time sequence.

10. The location anchor of claim 1, wherein the transceiver is configured to transmit a third signal that includes the angular orientation of the object with respect to the location anchor.

11. A location anchor comprising:

a transceiver;

a programmable processor;

executable control software stored on a non-transitory computer readable medium; and a pressure sensor, wherein the transceiver is configured to transmit a signal that includes information related to a reading from the pressure sensor to a location engine, wherein, based on the signal that includes the information related to the reading from the pressure sensor, the location engine is configured to determine a differential pressure between the pressure sensor and a second pressure sensor in an object, wherein the location anchor is separate from the object, and wherein the location engine is configured to determine the differential pressure, and wherein, based on the differential pressure, the location engine is configured to estimate an altitude of the object.

12. The location anchor of claim 11, wherein the transceiver is configured to transmit the signal continuously or at periodic intervals.

13. A system comprising:

a location engine; and a plurality of location anchors, wherein at least one of the plurality of location anchors comprises a plurality of directional transmitters and a pressure sensor, wherein the plurality of directional transmitters are configured to transmit a plurality of first signals to an object at a plurality of identifiable angles, wherein each directional transmitter of the plurality of directional transmitters is configured to include information unique to the respective identifiable angle in a corresponding first signal of the plurality of first signals transmitted from the plurality of directional transmitters, and wherein the pressure sensor is configured to determine a pressure reading at the at least one of the plurality of location anchors, wherein the location engine is configured to determine an angular orientation of the object with respect to the at least one location anchor based on the plurality of first signals, wherein, based on the angular orientation of the object with respect to the at least one location anchor, the location engine is further configured to estimate a location of the object, wherein the location engine is further configured to determine a differential pressure between the pressure sensor and a second pressure sensor in the object based on the pressure reading, and, based on the differential pressure, the location engine is further configured to estimate an altitude of the object.

14. The system of claim 13, wherein the plurality of directional transmitters comprises an LED or a laser diode.

15. The system of claim 13, wherein the object is configured to transmit information related to the angular orientation of the object with respect to the at least one of the location anchors to the location engine, and wherein, based on the information, the location engine is configured to determine the estimated location of the object.

16. A system comprising:

a location engine; and a plurality of location anchors, wherein at least some location anchors of the plurality of location anchors are configured to transmit first signals to the location engine, wherein the location engine is configured to receive a second signal from an object, wherein, based on the first signals and the second signal, the location engine is configured to determine a differential pressure between the at least some location anchors and the object, wherein the at least some location anchors and the object are separate, and wherein, based on the differential pressure, the location engine is configured to estimate an altitude of the object.

17. The system of claim 16, wherein the location engine is configured to use the estimated altitude of the object to determine a location of the object in three dimensions.

18. The system of claim 16, wherein the location engine is configured to weight the first signals received from the at least some location anchors based on an estimated distance of each respective location anchor from the object.

19. The system of claim 16, wherein the first signals comprise a pressure measured by a pressure sensor in a respective location anchor, and wherein the second signal includes a pressure measured by a pressure sensor in the object.

20. The system of claim 13, wherein the information unique to the respective identifiable angle comprises an identifier of the at least one location anchor and a sub identifier indicative of an angular direction of the respective identifiable angle.

* * * * *